June 16, 1953   R. C. STRAUSS   2,642,166
MOTOR CONTROL Filed Sept. 8, 1944   7 Sheets-Sheet 1

ATTEST-
Wm. C. Meiser

Ray C. Strauss
INVENTOR

BY George F. Mueller
ATTORNEY

June 16, 1953    R. C. STRAUSS    2,642,166
MOTOR CONTROL

Filed Sept. 8, 1944    7 Sheets-Sheet 3

ATTEST-
Wm C. Meiser

Ray C. Strauss
INVENTOR
BY George F. Mueller

June 16, 1953     R. C. STRAUSS     2,642,166
MOTOR CONTROL Filed Sept. 8, 1944     7 Sheets—Sheet 4

ATTEST—
*Wm C. Meiser*

Ray C. Strauss
INVENTOR
BY *George F. Mueller*
ATTORNEY

June 16, 1953  R. C. STRAUSS  2,642,166
MOTOR CONTROL

Filed Sept. 8, 1944  7 Sheets-Sheet 5

Ray C. Strauss
INVENTOR

BY George F. Mueller
ATTORNEY

ATTEST-
Wm C. Meiser

Ray C. Strauss
INVENTOR

BY George F. Mueller
ATTORNEY

ATTEST-
Wm C. Meiser

Fig. 24

Patented June 16, 1953

2,642,166

UNITED STATES PATENT OFFICE 2,642,166

MOTOR CONTROL

Ray C. Strauss, Ann Arbor, Mich.

Application September 8, 1944, Serial No. 553,274

7 Claims. (Cl. 192—3)

This invention relates to means for automatically regulating the flow of motive power to a motor on operation of the brake control of a motor driven vehicle, and is adapted for use with all types of motor driven vehicles, such as automobiles, busses, trucks and the like driven by fuel such as gasoline and diesel oil, and by motive power such as steam and electric energy.

Numerous means have been proposed for controlling the operation of throttle limiting devices upon operation of the brake control. These means have been designed to prevent waste of fuel and to increase the safety element. In certain of these devices, the brake and throttle pedals have been mounted in close proximity and in a common plane. This type of mounting has been proposed to reduce the reaction time to a minimum and permits the application of pressure to the brake pedal in the minimum time period.

One of the objects of this invention is to provide means for preventing the flow of motive power to the motor above the normal amount; for example, of fuel to the internal combustion engine above idling speed, upon application of pressure to the brake pedal.

Another object of this invention is to provide means whereby the throttle pedal may be depressed along with the brake pedal without permitting the flow of motive power to the engine above idling speed.

A further object of this invention is to provide means whereby the brake pedal and throttle pedal may be disposed in the conventional manner, may be disposed in close proximity or may or may not be disposed in a common plane.

A further object of the invention is to provide means for preventing the flow or limiting the flow of motive power to the engine above idling speed controlled by fluid pressure, mechanical action or electrical energy.

Another object of this invention is to provide means whereby the driver of a vehicle may fix or set the hand throttle and when the brake is applied, the motive power; for example, the fuel supply, is automatically reduced to that which is normal for idling speed.

Other objects and advantages of this invention will become apparent from the following description and claims taken in conjunction with the drawings, wherein:

Fig. 21 is a perspective view of a control unit operated by hydraulic pressure.

Fig. 24 is a perspective view of a control unit as adapted for use with a tractor, tank, or the like.

In the various figures, the engine or motor block is designated by the numeral 1 and the carburetor by the numeral 2.

Figure 1:
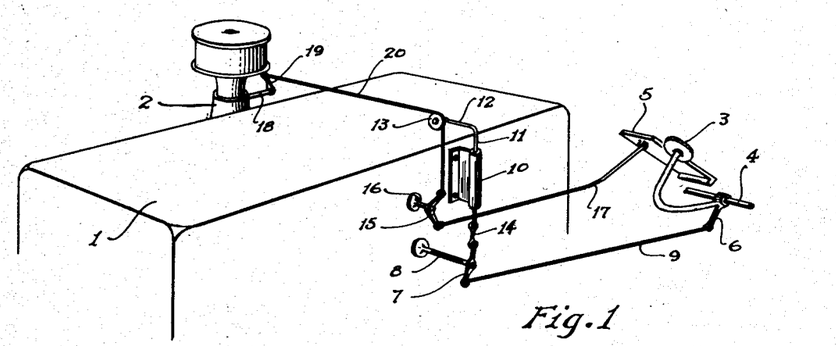
Figs. 1 and 2 are perspective views of various linkage systems for reducing the fuel fed to the engine upon application of the brake pedal.

In the embodiment illustrated in Fig. 1, the carburetor 2 is disposed on the usual intake manifold, not shown, which is in turn mounted on the motor block 1. The brake pedal 3 is pivotally mounted on a shaft 4 which is mounted below the usual floor boards and the accelerator pedal 5 is pivotally mounted above the floor boards in the conventional manner. A depending arm 6 is secured to or may be integral with the brake pedal mounting collar. A bell crank 7 is rotatably secured to a post 8 which is in turn secured to the motor block. A link or rod 9 connects one arm of the bell crank 7 with depending arm 6. A bearing plate or block 10 is mounted adjacent the top of the motor block. Bar 11 is slidably mounted in bearing block 10 and is provided with a horizontally extending arm 12. A sheave or pulley wheel 13 is rotatably mounted on the free end of arm 12. The bar 11 is connected with the bell crank 7 by a link 14.

A bell crank 15 is rotatably secured to a second post 16 which is in turn secured to the motor block. The accelerator pedal 5 is connected to one arm of bell crank 15 by push rod or link 17. The carburetor is provided with the conventional valve shaft 18 and crank 19 is secured to the shaft. A cable 20 connects bell crank 15 and crank 19, passing over sheave 13. Means may be provided to prevent cable 20 from leaving the groove of sheave 13.

In operation, application of pressure to the accelerator pedal results in a clockwise rotation of bell crank 15, this motion being transmitted to the valve shaft 18 through cable 20. Upon operation of the brake pedal, the crank 7 is rotated in a counterclockwise direction and bar 11 is moved downwardly. Downward motion of the bar carries sheave 13 downwardly and slackens cable 20, thereby rendering any depression of the accelerator pedal ineffective in affecting the valve shaft 18.

Figures 2, 3:
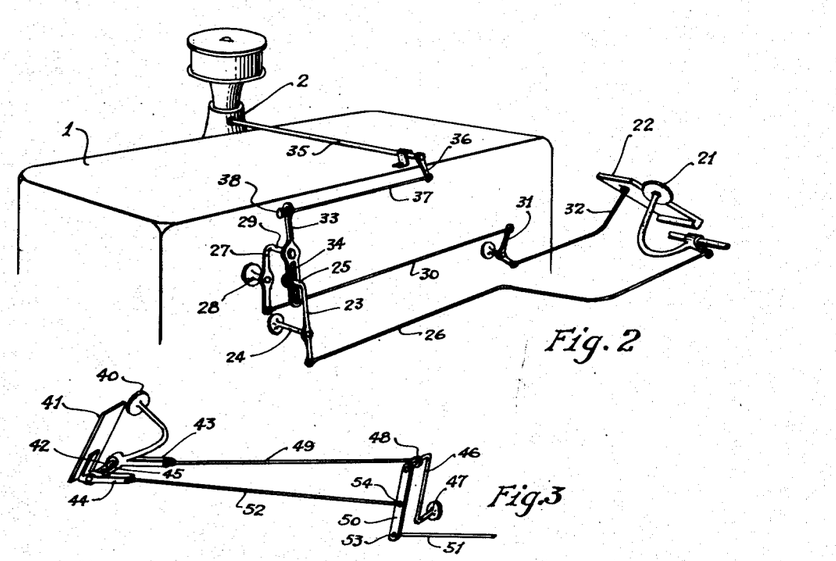
Figs. 3 and 4 are perspective views of a further embodiment of this invention.
Figures 6, 7, 8:
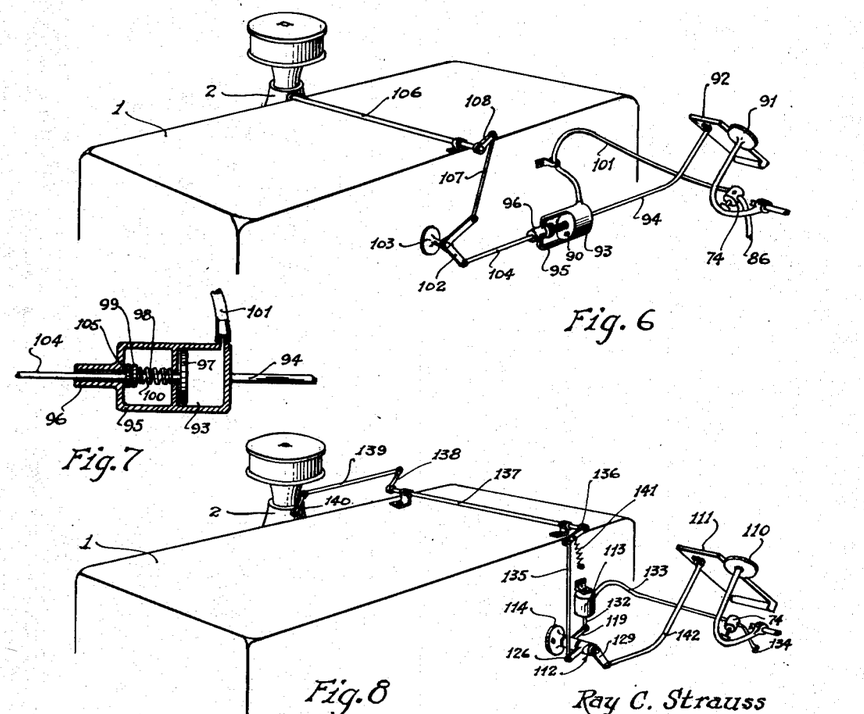
Fig. 7 is a sectional view, at an enlarged scale, of the vacuum control chamber employed in the apparatus illustrated in Fig. 6.

In Fig. 2, a brake pedal 21 and an accelerator pedal 22 are mounted in the conventional manner. A bell crank 23 is rotatably mounted on post 24 which is in turn mounted on motor block 1. The upper end of bell crank 23 is turned inwardly at right angles to form a pin 25. The lower end of bell crank 23 is connected to the brake pedal arm by link 26. A second bell crank 27 is rotatably mounted on post 28 which is in turn mounted on motor block 1. The upper end of bell crank 27 is turned outwardly at right angles to form a pin 29. The lower end of bell crank 27 is connected with accelerator pedal 22 by means of push rod or link 30, crank 31 and push rod or link 32. A lever 33 is pivotally secured to the pin 29 of bell crank 27. The lower portion of lever 33 is provided with a slot 34 which receives pin 25 of crank 23. The carburetor shaft 35 is provided with a crank 36. Rod 37 is connected to crank 36 and passes through the upper end of lever 33 and is provided with an enlarged bearing head 38. It is apparent that suitable means is provided to constantly urge the carburetor shaft 35 into normal throttle position, as illustrated in Fig. 8.

The brake pedal arm preferably extends to one side and in front of the shaft so that link 26, the brake pedal arm and shaft are in a single line. The force exerted on arm 26 upon application of pressure to the accelerator pedal is thus rendered ineffective in causing a braking action or motion of the brake pedal arm and associated elements.

Upon application of pressure to the accelerator pedal, motion is transmitted to bell crank 27 causing a counterclockwise rotation of the bell crank. Bell crank 23 remains fixed and pin 25 serves as a pivotal point for lever 33. The motion of crank 27 and 29 causes a pivoting of lever 33 about pivot point or pin 25 in a counterclockwise direction. The upper end of lever 33 pulls rod 37 and thereby opens the carburetor valve.

If pressure is simultaneously applied to brake pedal 21, bell crank 23 is rotated in a counterclockwise direction thereby shifting the pivot point or pin 25 and rotating lever 33 in a clockwise direction permitting a return of valve shaft 35 and crank 36 to their idling position. The carburetor valve may be constantly urged into a throttle position by spring means, such as illustrated in Fig. 8. If the accelerator pedal is in idling position, application of pressure to the brake pedal causes a counterclockwise rotation of crank 23 which through pin 25 causes a clockwise rotation of lever 33 about pin 29. Such movement of lever 33 introduces slack between the upper end of lever 33 and head 38 on rod 37 whereby any rotation of lever 33 about pin 25 caused by movement of accelerator pedal 22 is ineffective in opening the carburetor valve.

Figure 4:
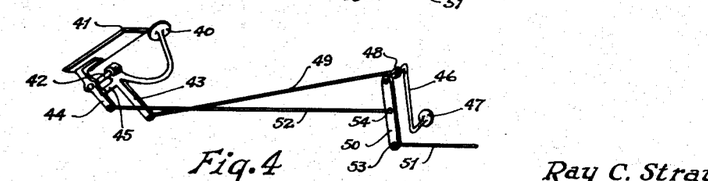

In Figs. 3 and 4, the brake pedal 40 and accelerator pedal 41 are mounted pivotally on shaft 42. A lever 43 is secured to or integral with the brake pedal arm. A lever 44 is secured to or integral with the accelerator pedal arm. A spur 45 is also secured to or integral with the brake pedal arm and extends over lever 44 of the accelerator arm. A crank 46 is rotatably mounted on the vehicle frame or motor block by means of a suitable bearing block 47. The free end of the crank may be bent outwardly or provided with a pin 48. Lever 43 is connected to pin 48 or the free end of the crank by rod 49. A lever 50 is pivotally supported from the free end of the crank or pin 48 and is preferably of the same length as the crank 46. The lower end of lever 50 is connected with the carburetor valve shaft through rod 51 and a suitable crank secured to the valve shaft, as in Fig. 2. Lever 44 is connected to the midpoint 54 of lever 50 by rod 52.

In the normal position of the brake pedal and accelerator pedal, the lever 43 and rod 49 are in line to form a stiff-arm arrangement similar to that described with Fig. 2.

In operation, pressure applied to accelerator pedal 41 causes a clockwise rotation of lever 50 about pin 48 and moves rod 51 to open the carburetor valve. Application of pressure to brake pedal 40 causes a counterclockwise rotation of crank 46 and thereby moves the pin 48 which serves as a pivot point for lever 50. If the accelerator pedal is free, spur 45 causes a simultaneous movement of lever 44, as illustrated in Fig. 4, and thereby maintains the lower end 53 of lever 50 in a fixed position and the carburetor valve remains at throttle level. If the accelerator pedal is depressed when the brake pedal is in a depressed position, lever 50 is rotated about the midpoint 54 thereby tending to return the lower end 53 into its throttle position. Such motion of lever 50 results until the lower end 53 is returned to its throttle position and lug 45 contacts lever 44. Further movement of brake pedal 40 merely results in a rotation of crank 46 about the bearing 47 and lever 50 about its lower end 53.

Figure 5:
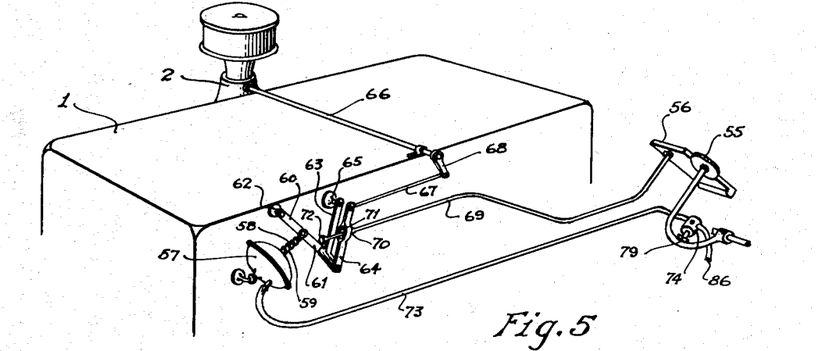
Figs. 5, 6 and 8 are perspective views of control means operated by fluid pressure.
Figure 13:
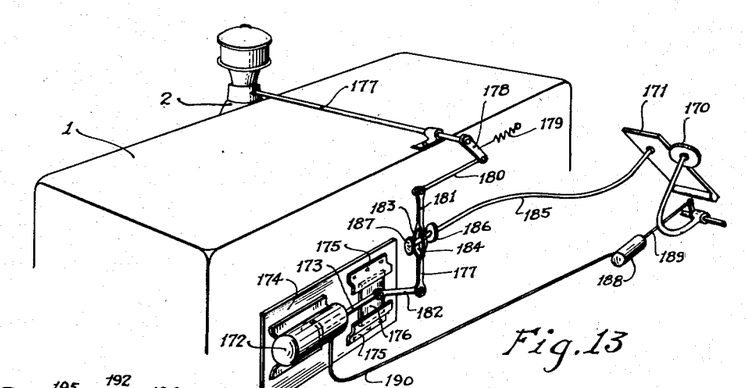
Figs. 13 and 21 are perspective views showing control units operated by hydraulic pressure.

The control device illustrated in Fig. 5 is operated by vacuum. The brake pedal 55 and accelerator pedal 56 are mounted in the conventional manner. A diaphragm chamber 57, to be described in detail hereinafter, is secured to the motor block 1. A shaft 58 is secured to the diaphragm and passes through the chamber. A spring 59 is threaded on shaft 58. Toggle arms 60 and 61 are pivotally secured to the extremity of shaft 58. The free end of arm 60 is pivotally secured to post 62 which is in turn secured to motor block 1. The free end of arm 61 is pivotally secured to crank 63 and lever 64. The opposite end of crank 63 is pivotally secured to post 65 which is in turn secured to the motor block. The opposite end of lever 64 is connected to the carburetor shaft 66 through rod 67 and crank 68. A tension spring may be secured to crank 68 and the motor block to constantly urge shaft 66 and the carburetor valve into idling position, as illustrated in Fig. 13. Accelerator pedal 56 is connected with lever 64 by means of rod 69 which is provided with a shoulder 70 adapted to bear against lever 64. Rod 69 passes through a slot 71 in lever 64 and may be provided with an enlarged head 72 to prevent accidental withdrawal of rod 69 from slot 71. The diaphragm chamber 57 is connected with a source of vacuum by means of tube 73 through a valve 74.

Figure 9:
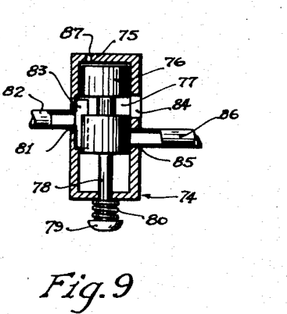
Fig. 9 is a sectional view of the vacuum control valve of Figs. 5, 6 and 8.

The valve 74 is illustrated more clearly in Fig. 9. The valve comprises a valve chamber 75 and a slide valve 76 having a circumferential groove 77 and a stem 78 which passes through one end wall of chamber 75. The stem 78 is provided with an enlarged head 79 and a compression spring 80 is threaded on stem 78 between head 79 and the end wall of chamber 75. The valve chamber 75 is provided with a port 81 which communicates with the diaphragm chamber through conduit 82. The inner wall of the chamber is provided with a channel 83 adjacent port 81. The port may be positioned at the midpoint of the valve travel. An air port 84 is provided in the chamber wall and is positioned so as to register with groove 77 when the slide valve 76 is at one end of its travel. A vacuum port 85 is provided in the chamber wall and is positioned so as to register with the groove 77 when the slide valve 76 is at the opposite end of its travel. Vacuum port 85 communicates with a source of vacuum by conduit 86. A relief port 87 may be provided in the closed end of valve chamber 75 to prevent the formation of an air cushion.

In normal position, the brake pedal arm depresses slide valve 76 and the diaphragm chamber 57 communicates with the atmosphere through conduit 73, channel 83, groove 77 and port 84. Spring 59 maintains shaft 58 in its extended position, as illustrated in Fig. 5. Upon depression of accelerator pedal 56, lever 64 is pivoted about its lower end by movement of rod 69. Such movement of lever 64 is transmitted to the carburetor valve through rod 67, crank 68 and valve shaft 66. If the brake pedal is depressed simultaneously, slide valve 76 is moved to such position that groove 77 registers with vacuum port 85 and diaphragm chamber 57 is connected with the source of vacuum. Shaft 58 is thereby drawn into the chamber 57. Crank 63 is pivoted in a clockwise direction about its upper end and lever 64 is pivoted in a clockwise direction about shoulder 70 tending to return the upper end of lever 64 into its idling position and causing a closing of the carburetor valve. If the accelerator pedal is not depressed when the brake pedal is depressed, lever 64 is pivoted about its upper end and slot 71 slides along rod 69 between shoulder 70 and head 72 so that movement of the accelerator pedal will not effect a change of the carburetor valve.

In the apparatus illustrated in Fig. 6, the brake pedal 91 and accelerator pedal 92 are mounted in the conventional manner. The accelerator pedal is connected to vacuum chamber 93 by rod 94. The vacuum chamber is provided with an extending stirrup 95 preferably provided with a bearing 96. A closely fitting piston 97 is disposed in the vacuum chamber. The piston rod 98 is provided with a pressure plate 99. A spring 100 is threaded on piston rod 98 between pressure plate 99 and the vacuum chamber. The vacuum chamber communicates with valve 74 through conduit 101. The valve 74 in turn communicates with a source of vacuum by means of conduit 86.

Bell crank 102 is rotatably mounted on post 103 which is in turn mounted on the motor block 1. One arm of bell crank 102 is pivotally connected with a rod 104 which passes through bearing 96. The inner end of rod 104 is provided with a pressure plate 105. The other arm of bell crank 102 is connected to the carburetor valve shaft 106 through rod 107 and crank 108. The vacuum chamber 93 may be provided with a vent 90 to prevent the formation of an air cushion on movement of the piston 97.

On application of pressure to accelerator pedal 92, the motion is transmitted to bell crank 102 by rod 94, vacuum chamber 93, piston rod 98 and spring 100, pressure plates 99 and 105 and rod 104. Bell crank 102 is moved in a clockwise direction and opens the carburetor valve. On application of pressure to the brake pedal 91, valve 74 connects the source of vacuum to vacuum chamber 93 and piston 97, piston rod 98 and bearing plate 99 are drawn rearwardly against the force of spring 100. In this position of these elements, pressure applied to the accelerator pedal is ineffective in opening the carburetor valve since pressure plates 99 and 105 are separated. Spring means may be provided to constantly urge the shaft 106 and carburetor valve into idling position. If the accelerator pedal remains in depressed position when the brake pedal is depressed, such spring means will return the shaft 106 and carburetor valve into idling position.

Figure 10:
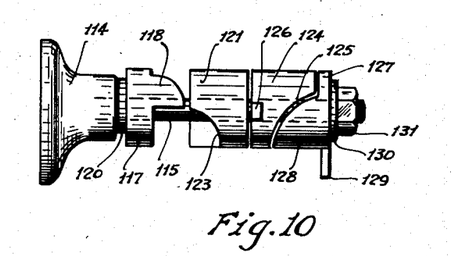
Fig. 10 is an elevational view of a further control unit.
Figure 11:
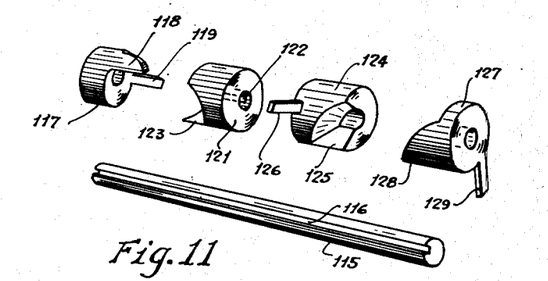
Fig. 11 is a perspective view of the elements illustrated in Fig. 10 in which the elements are shown separated.

In the construction illustrated in Figs. 8, 10 and 11, there is shown a series of cooperating cams controlled by a diaphragm. The brake pedal 110 and accelerator pedal 111 are mounted in the conventional manner. The cam assembly 112 and diaphragm chamber 113 are mounted on the motor block 1. A bracket 114 is secured to the motor block 1 and a shaft 115 is mounted in the bracket. The shaft 115 is provided with a longitudinally extending groove or key way 116. A collar 117 is provided with a projecting cam 118 and is rotatably mounted on the shaft 115. A lever 119 is secured to the collar. If desired, a washer 120 may be interposed between the bracket 114 and collar 117. A second collar 121 having an integral key 122 is mounted on the shaft, the key registering with key way 116. The collar 121 is provided with a cut-out segment 123 which conforms to the projecting cam 118 and is adapted to receive the cam 118. The collar 121 is adapted to slide along shaft 115.

A collar 124 is rotatably mounted on shaft 115 and is provided with a cut-out segment 125. A lever 126 is secured to collar 124. A collar 127 is rotatably mounted on shaft 115 and is provided with a projecting cam 128. The cut-out segment 125 is adapted to receive cam 128. A lever 129 is secured to collar 127. A washer 130 may be disposed between collar 127 and nut 131 which maintains the collars in position on the shaft 115. For illustrative purposes, the elements are shown slightly separated in Fig. 10, Lever 119 is pivotally secured to pin 132 which is secured to the diaphragm within chamber 113 and projects from the chamber. The diaphragm chamber communicates with valve 74 by means of conduit 133. The valve 74 communicates with a source of vacuum by means of conduit 134. Lever 126 is connected with the carburetor valve shaft through rod 135, arm 136, shaft 137, arm 138, link 139 and arm 140. A tension spring 141 is preferably secured to the motor block 10 at one end and to arm 136 at its opposite end to constantly urge the carburetor valve and collar 124 into normal or throttle position. Lever 129 is connected with accelerator pedal 111 by means of push rod 142.

The normal position of the cams is illustrated in Fig. 10. Cam 118 bears against collar 121 thereby retaining cam 128 in cut-out segment 125 of collar 124. Upon application of pressure to accelerator pedal 111, collar 127 is rotated in a clockwise direction. Cam 128 carries with it collar 124 and through lever 126 and the intermediate elements causes an opening of the carburetor valve. Upon application of pressure to the brake pedal 110, valve 74 connects diaphragm chamber 113 with the source of vacuum and pin 132 is drawn into the chamber. Collar 117 and cam 118 are thereby rotated so that cam 118 registers with cut-out segment 123. The force of spring 141 is sufficient to cause the cut-out segment 125 in collar 124 to ride along cam 128 and simultaneously move collar 124 and collar 121 along the shaft 115 whereby the carburetor valve is brought to its idling position. The positioning or movement of collar 127 and cam 128 is thereby ineffective in affecting the opening of the carburetor valve until the cam assembly is returned to normal position. Upon release of pressure from the brake pedal, valve 74 opens diaphragm chamber 113 to the atmosphere and pin 132, collar 117 and cam 118 are returned to their normal position. Cam 118 rides on the arcuate surface of cut-out segment 123 forcing collars 124 and 127 into their normal cooperative positions.

Figure 12:
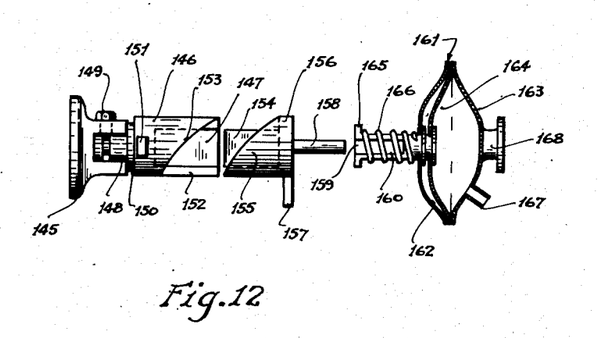
Fig. 12 is an elevational view of a further form of control unit, the elements being shown separated.

In Fig. 12 there is illustrated a modification of the control mechanism shown in Figs. 8, 10 and 11. The bracket 145 is adapted to be secured to the motor block 1. A cylindrical cam element 146 having a hollow core 147 is rotatably secured to bracket 145 by grooved shaft 148 and set screw 149. If desired, a washer 150 may be interposed between cam element 146 and bracket 145. Lever 151 is secured to the cam element 146. A segment 152 is cut from the cylindrical element to form a cam surface 153.

A cylindrical element 154 provided with a circumferential cam 155 cooperates with cam element 146. The cylindrical element 154 and cam 155 may be integral with a flange 156. A lever 157 may be secured to flange 156. A coaxial shaft 158 is also preferably integral with flange 156 and is adapted to be received by duct 159 of pin 160.

The diaphragm chamber 161 comprises a pair of dished plates 162 and 163. An elastic diaphragm 164 is securely clamped between the dished plates. A pin 160 is securely fastened to the diaphragm and projects through an aperture in the plate 162. The outer end of pin 160 may be provided with a flange 165. A compression spring 166 is preferably positioned on the pin 160 between flange 165 and plate 162 to constantly urge the pin into the position illustrated. Plate 163 is provided with a port 167 which communicates with a valve 74. Plate 163 is secured to a bracket 168 which is secured by suitable means to the motor block or other suitable fixed member. Lever 151 is connected by suitable cranks and links to the carburetor shaft in a manner similar to that used in connecting lever 126 in Fig. 8. Lever 157 is connected to the accelerator pedal in the same as used in connecting lever 127.

In the normal operative position of the elements, flange 156 abuts against the open end of cylindrical element 146 and cam 155 is in contact with surface 153. Shaft 158 is positioned in duct 159 and is secured to pin 160 by a cotter pin or other suitable means, not shown.

Pressure applied to the accelerator pedal causes an opening of the carburetor valve in the same manner as the operation of the device of Fig. 8. Upon application of pressure to the brake pedal, a vacuum is drawn in the diaphragm chamber and the diaphragm 164 draws pin 160 inwardly. Cam 155 is thereby removed from cooperating position with surface 153 and pressure applied to the accelerator pedal is ineffective in affecting the carburetor valve.

In the device illustrated in Fig. 13, the control unit is operated by hydraulic pressure. The brake pedal 170 and accelerator pedal 171 are mounted in the conventional manner. A pressure chamber 172 provided with a piston and piston rod 173 is secured to a base 174 which is in turn secured to the motor block 1. A pair of channels 175 are secured to the opposite end of base 174 and receive reciprocating block 176, which is secured to piston rod 173.

The carburetor valve shaft 177 may be extended across the motor block. An arm 178 is secured to the carburetor shaft and a spring 179 may be provided to constantly urge the carburetor valve into throttle position. A link 180 is pivotally secured to arm 178 and to lever 181. Lever 181 is also pivotally secured to connecting rod 182 which is also pivotally secured to slide block 176. The lever 181 is provided with an enlarged section 183 intermediate the points of connection with link 180 and connecting rod 182. The enlarged section is provided with a slot 184 adapted to receive push rod 185 which is connected with the accelerator pedal 171. Rod 185 is provided with a flange 186 adapted to bear against the enlarged section 183 of lever 181 and with an enlarged head 187 to prevent accidental withdrawal of the rod from slot 184.

A pressure or pump member 188 is secured to the vehicle and is provided with a piston rod 189. The piston rod is connected by suitable means to the brake pedal arm. The pump communicates with pressure chamber 172 by means of conduit 190.

In operation, pressure on the accelerator pedal causes a counterclockwise movement of lever 181 and opens the carburetor valve, the movement of the lever centering about the connection between lever 181 and connecting rod 182. Application of pressure to the brake pedal causes a movement of the slide block 176 toward pressure chamber 172. Lever 181 moves in a clockwise direction about the upper end of lever 181 and introduces slack between flange 186 and lever 181. Pressure on the accelerator pedal is thereby ineffective in opening the carburetor valve.

Figures 14, 15:
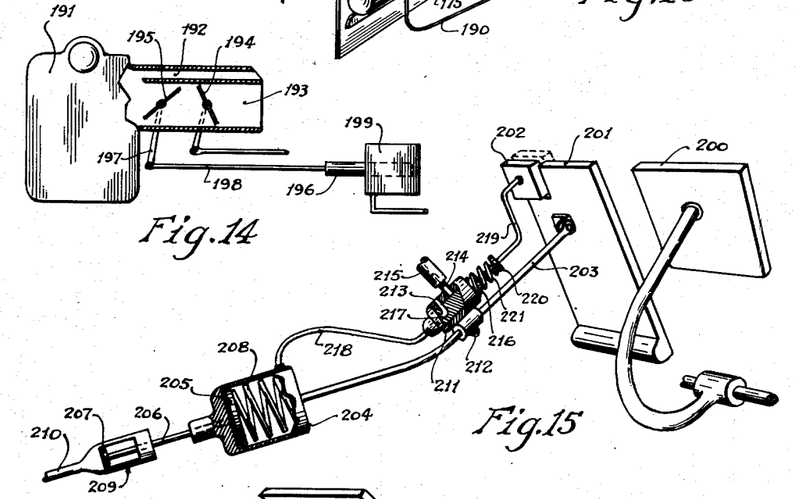
Fig. 14 is a diagrammatic illustration of a carburetor and an electrically controlled limit unit.
Fig. 15 is a perspective view of a further form of control device.

In Fig. 14, there is illustrated a control unit operated by electric energy. The carburetor 191 is provided with a throttle by-pass 192. The conduit or duct 193 is provided with two butterfly type valves 194 and 195. Valve 194 is connected through suitable cranks and links with the accelerator pedal and is normally urged into a closed position by suitable spring means. Valve 195 is normally urged into a fully open position by suitable spring means and is connected with plunger 196 by crank 197 and rod 198. A solenoid 199 is secured to the motor block or other fixed portion of the vehicle. A switch operated by the brake pedal is connected electrically between the source of current and the solenoid. Upon application of pressure to the accelerator pedal, the carburetor valve 194 is opened in the conventional manner. Upon application of the brake, the switch, not shown, closes the circuit between the source of current and the solenoid and energizes the solenoid in a manner similar to the operation of conventional brake or stop lights thereby drawing plunger 196 into the solenoid. Such movement of the plunger closes valve 195 and prevents the flow of fuel to the engine or motor above that required for normal idling.

In the device illustrated in Fig. 15, the brake pedal 200 and accelerator pedal 201 are mounted on substantially the same plane and in close proximity. In operation, the operator's foot may be merely pivoted about the heel to lift the ball of the foot from one pedal to another. This close relationship of the two pedals would tend to cause a simultaneous application of pressure to both pedals. In order to prevent opening of the carburetor valve upon application of the brake, the accelerator pedal 201 is provided with a control section or button 202. The control section is normally urged into a position slightly above the surface of the accelerator pedal, as illustrated in broken lines. It is obvious that the control section can be placed at any other desired point on the accelerator pedal.

The accelerator pedal is connected to a thrust rod 203 secured to a vacuum chamber 204. The chamber is provided with a piston 205 and a projecting piston rod 206 which terminates in a pusher plate 207. A compression spring 208 is disposed between one end of the chamber 204 and the piston 205 to constantly urge the piston and piston rod toward the extended position of the piston rod. The outer end of the piston rod and pusher plate 207 are received by a spider 209 which is secured to rod 210 which is connected by suitable links and cranks to the carburetor valve shaft.

A valve body 211 is secured to rod 203 by suitable means such as a clamp 212. The valve body is provided with a port 213 which is open to the atmosphere and a second port which communicates with a source of vacuum by nipple 214 and conduit 215. A slide valve 216 is positioned in the valve body 211 and is adapted to be reciprocated in the valve body. The slide valve is provided with a passage 217 which communicates with a conduit 218 which in turn communicates with the vacuum chamber 204. The duct or passage 217 is adapted to be placed in registry with the port 213 and nipple 214 to thereby subject the vacuum chamber to the pressure of the atmosphere or to the source of vacuum. The slide valve 216 is operatively connected with control section 202 by means of rod 219. A washer 220 is secured to rod 219 and a spring 221 is disposed between valve body 211 and washer 220 to constantly urge control section 202 above the accelerator pedal.

As the control section is depressed to the plane of the accelerator pedal, slide valve 216 is moved into the position in which passage 217 registers with port 213 thereby opening the vacuum chamber to the atmosphere. Spring 208 forces the piston and piston rod into extended position, and pusher plate 207 contacts spider 209. The various positions are illustrated in Fig. 15. Application of pressure to the accelerator pedal results in the opening of the carburetor valve. If the operator's foot is shifted slightly and removed from the control section, spring 221 forces control section 202 above the plane of the accelerator pedal and slide valve 216 is moved into a position in which passage 217 registers with nipple 214. Vacuum chamber 204 is thus connected to the source of vacuum and piston 205 is moved inwardly against the pressure of spring 208. Piston rod 206 and pusher plate 207 are likewise moved toward the vacuum chamber. Pressure applied to the accelerator pedal is thereby ineffective in moving spider 209 and rod 210 and the carburetor valve remains in idling position.

Figure 16:
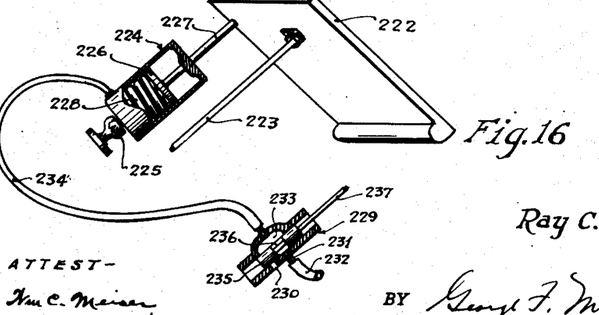
Fig. 16 is a perspective view of an accelerator pedal provided with stop means operable upon application of pressure to the brake pedal.

In the device illustrated in Fig. 16, there is provided a stop rod mechanism to work against pressure applied to the accelerator pedal. The accelerator pedal 222 is mounted in the conventional manner and is provided with the usual thrust rod 223. A vacuum chamber 224 is secured to the motor block or frame, not shown, and is provided with a piston 226 and piston rod 227. A spring 228 is disposed in the vacuum chamber and constantly urges the piston into a position in which the piston rod is extended. The free end of the piston rod bears against the accelerator pedal and resists any pressure applied to the pedal.

A valve chamber 229 is secured to the motor block or vehicle frame, not shown. The valve chamber is provided with a port 230 which is open to the atmosphere and a second port which is fitted with a nipple 231. The nipple communicates with a source of vacuum by means of conduit 232. The valve chamber is also provided with a channel 233 opposite the ports. The vacuum chamber 224 communicates with chamber 233 of the valve 229 by means of conduit 234. A slide valve 235 is disposed in valve chamber 229 and is provided with a circumferential groove or channel 236 which is adapted to connect channel 233 with port 230 and nipple 231. Slide valve 235 is secured to a suitable rod 237 which is in turn pivotally secured to the brake pedal arm.

In normal operative position, that is, when no pressure is applied to the brake pedal, slide valve 235 occupies the position illustrated and vacuum chamber 224 communicates with the source of vacuum through conduit 234, chamber 233, groove 236, nipple 231 and conduit 232. Pressure applied to the accelerator pedal 222 is transmitted by rod 223 to the links and cranks, not shown, to open the carburetor valve. Upon application of pressure to the brake pedal, slide valve 235 is moved into a position in which groove 236 registers with port 230 and thereby opens vacuum chamber 224 to the atmosphere and spring 228 forces piston 226 to the right end of the chamber. The piston rod is thereby extended and its outer end serves as a stop for the accelerator pedal.

Figure 17:
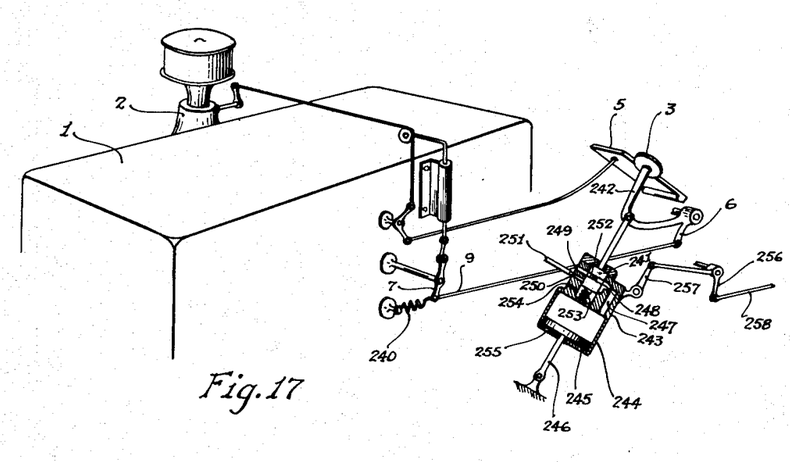
Fig. 17 is a perspective view of the control unit of Fig. 1 operatively connected with a booster brake system.

In Fig. 17, I have illustrated a modification of the construction shown in Fig. 1 wherein a booster brake system is employed. The brake pedal 3 is mounted in the conventional manner and is provided with a depending arm 6 which is pivotally connected to rod 9 which is in turn pivotally connected to bell crank 7, as described in connection with Fig. 1. A spring 240 may be secured to the motor block 1 and to bell crank 7 to constantly urge the mechanism toward the normal position as illustration in Fig. 17.

A slide valve 241 is pivotally secured to brake pedal arm 242. The slide valve 241 is disposed in a valve body 243 which is preferably integral with cylinder 244. A piston 245 provided with piston rod 246 is positioned within cylinder 244. The piston rod is pivotally secured to the vehicle frame. The valve body is provided with a passage or duct 247 which opens into the cylinder 244 and terminates in a channel 248 adjacent the slide valve. The opposite side of the valve body is provided with a port 249 which opens to the atmosphere and a port 250 which communicates with a source of vacuum through conduit 251. Slide valve 241 is provided with a circumferential groove 252 which is adapted to connect channel 248 with ports 249 and 250 depending upon the positioning of the valve. A suitable spring 253 may be disposed between the end of valve 241 and the cylinder wall. A relief port 254 is preferably provided adjacent the closed end of the valve body to prevent formation of an air pocket or cushion. The cylinder 244 is provided with a relief port 255 to open the cylinder to the atmosphere.

A bell crank 256 is pivotally mounted on the vehicle, one arm being pivotally connected to link 257 which is in turn pivotally secured to the valve body and cylinder. The other arm of bell crank 256 is pivotally connected to a rod 258 which is connected to the brake operating mechanism, such as the brake rods or the master brake cylinder in a hydraulic brake system.

Upon application of pressure to the brake pedal, slide valve 241 is moved into such position that groove 252 closes port 249 and connects channel 248 and port 250. The vacuum draws the cylinder downwardly, thereby applying the brakes through link 257, crank 256 and rod 258. The brake pedal is simultaneously depressed manually. Additional braking power may be obtained by manual pressure applied to the brake pedal which is transmitted through slide valve 241 and to cylinder 244. Such movement of brake pedal 3 causes a clockwise movement of bell crank 7 to eliminate transmission of any movement of accelerator pedal to the valve of carburetor 2, as described in connection with Fig. 1. Upon release of pressure from the brake pedal, the spring 253 moves slide valve into the position illustrated in Fig. 17 and channel 248 is connected with port 249 thereby opening cylinder 244 to the atmosphere. Spring 240 returns the brake pedal and mechanism to the normal position, as illustrated. If desired, a spring may be placed in cylinder 244 to constantly urge the mechanism toward the normal inoperative position. It is apparent that in place of the valve unit illustrated, it is possible to employ an independent valve, as illustrated in Fig. 9, if desired.

Figures 18, 19, 20:
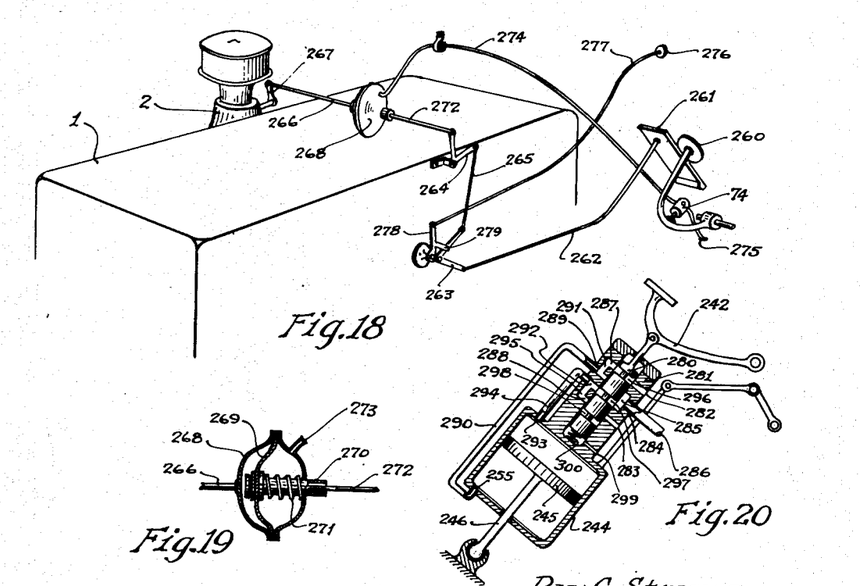
Fig. 18 is a perspective view of a further form of control unit illustrating a hand throttle.
Fig. 19 is a sectional view of the vacuum chamber and pull rods of Fig. 18.
Fig. 20 is a sectional view of a booster brake cylinder and valve unit.

In Fig. 18, I have illustrated a further embodiment of my invention in which the control section forms a part of the pull rod operating the carburetor valve and including an illustration of the hand throttle. A brake pedal 260 and accelerator pedal 261 are mounted in the conventional manner. A thrust rod 262 is pivotally secured at one end to the accelerator pedal 261 and at the other end to one arm of crank 263 which is rotatably secured to the motor block 1. The other arm of crank 263 is connected to one arm of crank 264 through rod 265. Pull rod 266 is secured to arm 267 which is secured to the valve shaft of the carburetor 2. The opposite end of rod 266 is secured to vacuum chamber 268. A diaphragm 269 is disposed in the vacuum chamber and is provided with an extending sleeve 270 which projects from one side of the chamber. A spring 271 is disposed in the chamber and is positioned on sleeve 270 adapted to constantly urge the diaphragm into such position that the sleeve is drawn inwardly into the chamber. A pull rod 272 passes through the sleeve 270 and is pivotally secured to crank 264. The chamber is provided with a port 273 which communicates with a source of vacuum through conduit 274, valve 74 and conduit 275.

The hand throttle includes the usual knob 276 mounted on the dash panel and is connected with a pull rod or cable 277. The cable 277 is connected to an arm 278 which may be pivotally mounted on the same support as used for crank 263. Arm 278 is provided with an extending lug or spur 279 which cooperates with crank 263.

The carburetor valve may be opened by setting of the hand throttle or by application of pressure to the accelerator pedal. The resulting movement of crank 263 is transmitted to the carburetor valve through rod 265, crank 264, pull rod 272, chamber 268, rod 266 and arm 267. Upon application of pressure to the brake pedal, valve 74 connects vacuum chamber 268 with the source of vacuum and the diaphragm 269 is drawn toward the port 273. Sleeve 270 is extended thereby introducing sufficient slack between the sleeve and inner end of rod 272 to permit the carburetor valve to close. If the hand throttle has been set, the removal of pressure from the brake pedal again permits the carburetor valve to be automatically opened to the same degree as before pressure had been applied to the brake pedal. This arrangement is particularly advantageous when employed in connection with modern fluid and hydraulic types of drive and transmission means.

The valve unit and booster brake member illustrated in Fig. 20 may be employed in place of the valve unit and booster brake member shown in Fig. 17. A slide valve 280 is pivotally secured to brake pedal arm 242 and is disposed in a valve body 281 which is preferably integral with cylinder 244. The valve body may be a separate unit, if desired, and may be rigidly secured to the cylinder. A piston 245 provided with a piston rod 246 is positioned within the cylinder. The piston rod is pivotally secured to the vehicle frame. The valve body is provided at one side with two spaced ports 282 and 283 which are open to the atmosphere. A third port 284 is provided intermediate the ports 282 and 283 and terminates in a channel 285. The port 284 communicates with a source of vacuum through conduit 286. Ports 287 and 288 are provided in the valve body diametrically opposite ports 282 and 283, respectively. A port 289 is provided diametrically opposite the rearward or lower end of channel 285 and communicates with port 255 at the forward end of cylinder 244 by means of conduit 290. Ports 287 and 289 are connected by passage 291. A port 292 is provided diametrically opposite the forward end of channel 285 and communicates with port 293 at the rearward end of cylinder 244 by means of conduit 294. Ports 288 and 292 are connected by passage 295. Slide valve 280 is provided with three circumferential grooves 296, 297 and 298. The grooves are spaced so that groove 296 registers with port 287 and groove 297 registers with port 292, and groove 297 registers with port 289 and groove 298 registers with port 288 when the valve is moved into certain positions. A relief port 299 is preferably provided at the closed end of the valve body. A spring 300 is also provided in the valve body to urge the valve into neutral or inoperative position.

In the drawing, the brake pedal is shown depressed and the cylinder is drawn downwardly to apply the brakes. In the neutral or inoperative position, the cylinder 244 is at its rearward or uppermost position, similar to that shown in Fig. 17. In the inoperative position, the slide valve 280 is at its rearward or uppermost position, groove 298 registering with and connecting ports 283 and 288 thereby opening the upper end of the cylinder 244 to the atmosphere. Groove 297 registers with port 289 and channel 285 thereby subjecting the lower end of the cylinder 244 and the lower face of piston 245 to the vacuum thereby retaining the cylinder in its uppermost position.

Upon movement of the brake pedal into the position illustrated in Fig. 20, the slide valve 280 is moved into such position that groove 296 registers with and connects ports 282 and 287 thereby opening the lower end of the cylinder to the atmosphere. Groove 297 registers with and connects port 292 and channel 285 thereby subjecting the upper end of cylinder 244 and the upper face of piston 245 to the vacuum which draws the cylinder downwardly. Such movement of the cylinder causes an application of the brakes. If the operator maintains the brake pedal in an initial depressed position, the ports 287 and 292 are closed automatically as the cylinder and valve body are drawn downwardly. In such position, which may be termed a dead center position, groove 296 lies above port 287, groove 297 registers with the blind spot between ports 289 and 292 and groove 298 lies below port 288. In this position, the brakes remain fixed. If further braking power is required, the operator depresses farther the brake pedal to place the valve 280 in operative position as illustrated. It is obvious that the brakes may be maintained in set or fixed position by locking the brake pedal in such position as to keep the slide valve in dead center position.

Upon release of the pressure applied to the brake pedal, spring 300 moves slide valve 280 upwardly in the valve body and groove 298 registers with and connects ports 283 and 288 thereby opening the top of the cylinder to the atmosphere. Groove 297 registers with and connects port 289 and channel 285 thereby subjecting the lower end of the cylinder to the vacuum and the cylinder is pushed upwardly to release the brakes. Spring means is preferably provided to constantly urge the brake operating crank 256 into neutral or released position.

Figure 21:
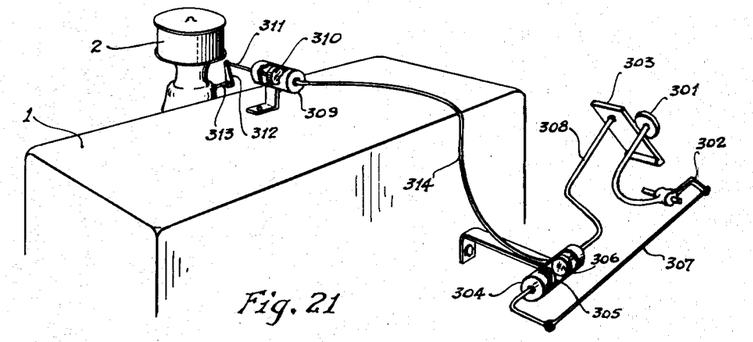

In Fig. 21 there is illustrated a modification of the device illustrated in Fig. 13. The brake pedal 301 is mounted below the floor boards of the vehicle and is provided with an arm 302. An accelerator pedal 303 is mounted above the floor boards in the conventional manner. A cylinder 304 is secured to the motor block 1 or to the vehicle frame and is provided with two opposed pistons 305 and 306. Piston 305 is secured to the rod 307 which is in turn secured pivotally to arm 302. Arm 302 and piston 304 and the cylinder are so positioned that in the normal position of the brake pedal, arm 302 and rod 307 are substantially parallel and rod 307 passes through the line of the axis on which is mounted brake pedal 301 to form a stiff-arm system as described hereinbefore. Piston 306 is secured to thrust rod 308 which is in turn secured to accelerator pedal 303.

A cylinder 309 is mounted on the motor block 1 adjacent the carburetor 2 or may be secured to the carburetor and is provided with a piston 310 which is secured to a projecting piston rod 311. Piston rod 311 is pivotally secured to arm 312 which is mounted on valve shaft 313. Cylinder 310 communicates with cylinder 304 by means of conduit 314. The cylinders and conduit are filled with a suitable fluid.

In operation, pressure applied to the accelerator pedal 303 moves piston 306 toward piston 305. The pressure is transmitted to piston 310 which is moved to open the carburetor valve. Application of pressure to the brake pedal when the accelerator pedal is depressed causes a counterclockwise movement of arm 302 thereby moving piston 305 away from piston 306. Such movement reduces the pressure in the system and returns the piston 310 to its initial position thereby closing the carburetor valve.

Figure 22:
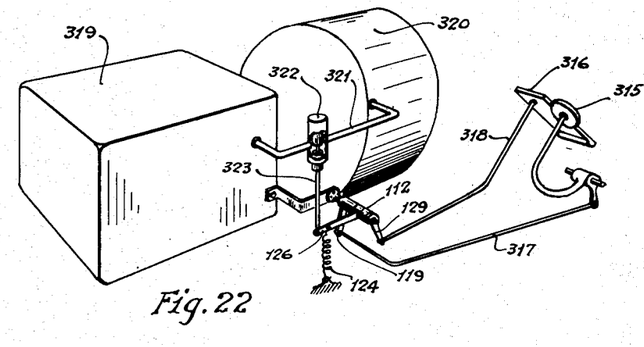
Fig. 22 is a perspective view of a control unit adapted for use with a steam driven motor or engine.

In Fig. 22 there is shown the control unit 112 of Figs. 8, 10 and 11 adapted for use in controlling the flow of fluid motive power, such as steam. The brake pedal 315 and accelerator pedal 316 are mounted in the conventional manner. Brake pedal 315 is connected to lever 119 by means of rod 317. Accelerator pedal 316 is connected to lever 129 by means of rod 318. The source of steam, such as a boiler, is indicated by the reference character 319 and the motor or engine, such as a turbine, by the reference numeral 320. The fluid motive power is transmitted to the motor 320 by means of conduit 321. The flow of fluid motive power to the motor is controlled or regulated by a suitable valve in the conduit, the opening of the valve being controlled by a valve element 323 which is connected to arm 126 by means of rod 323. A spring 124 is secured to arm 126 to constantly urge the valve into closed or throttling or normal position. The operation of the control unit 112 is similar to that described in the operation of the device illustrated in Fig. 8.

Figure 23:
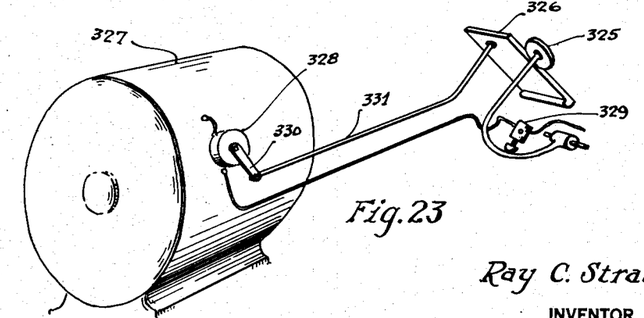
Fig. 23 is a perspective view of a control unit as adapted for use with an electric motor.

In Fig. 23 there is shown a control unit as adapted for use with an electrically driven vehicle. This control system is readily adaptable for use in electrically driven busses and the like. The brake pedal 325 and accelerator pedal 326 may be mounted in the conventional manner. The motor is indicated at 327 and a rheostat 328 may be secured to the motor frame. It is obvious that a control system other than a rheostat may be employed and may be mounted on the vehicle, such as a conventional controller, the rheostat being shown merely for the sake of simplicity. One side or pole of the rheostat is connected electrically to one pole of the motor. The other pole of the motor may be grounded or may be connected directly to one side of the line. The other side or pole of the rheostat is connected electrically to switch 329 which is connected to the other side of the line. The arm 330 of the rheostat is connected with rod 331 which is in turn secured to the accelerator pedal 326. Switch 329 is mounted below the floor boards in a manner similar to that of valve 74 described hereinbefore. The switch is normally closed.

The flow of motive power to the motor is governed by the position of the rheostat arm which is in turn dependent upon the position of the accelerator pedal. Upon application of pressure to the brake pedal, switch 329 is opened and arrests the flow of current to the motor.

Figure 24:
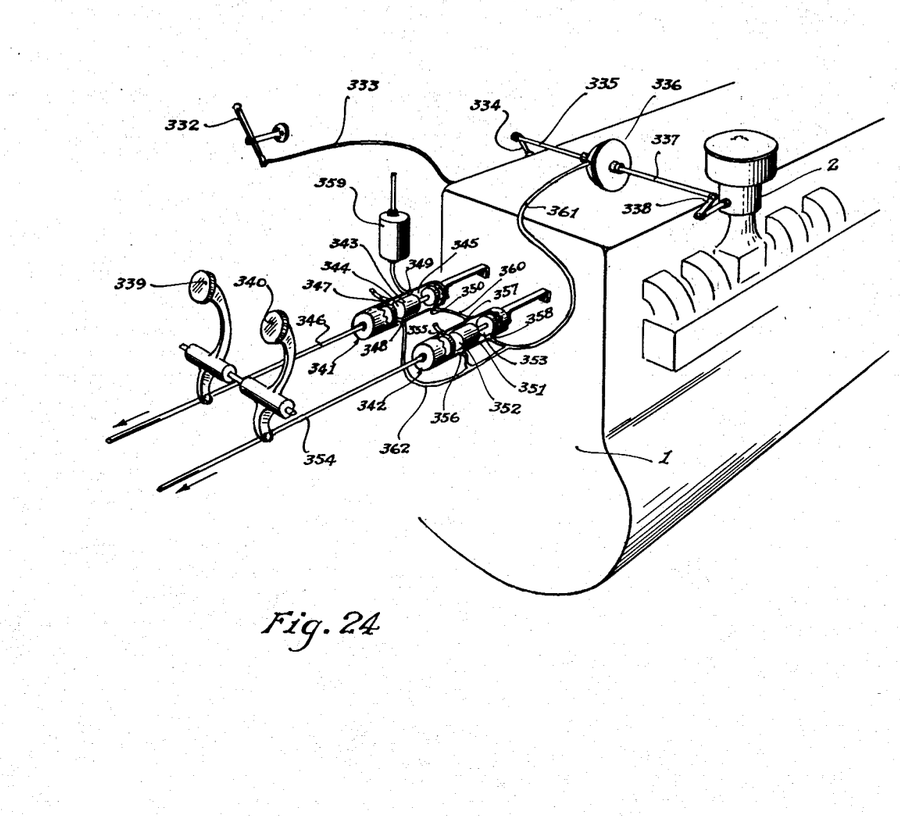

In Fig. 24 there is shown a control system which is adapted for use on tractors, tanks and the like, particularly on caterpillar types to increase the maneuverability. The fuel is fed to the engine 1 through the carburetor 2. The throttle valve is regulated by the dash lever 332 through a pull rod or cable 333, crank 334, pull rod 335, vacuum chamber 336, pull rod 337 and arm 338. The operation of the throttle regulating means is the same as described in connection with Fig. 18. A pair of brake pedals 339 and 340 are mounted on the vehicle and are operatively connected to the braking means on the left and right sides, respectively, of the vehicle.

A pair of valve chambers 341 and 342 are mounted on the vehicle or engine block, as desired. Each of the chambers or cylinders is provided with two pairs of opposite ports, one pair adjacent the rearward end of the cylinder and one pair adjacent the forward end of the cylinder. A slide valve 343 is mounted in cylinder 341 and is provided with a pair of circumferential grooves 344 and 345. The slide valve 343 is connected to a rod 346 which is pivotally secured to brake pedal 339. Groove 344 connects ports 347 and 348 in the normal position of the slide valve. When pedal 339 is depressed, the slide valve is moved so that groove 345 connects ports 349 and 350 and closes ports 347 and 348.

A similar slide valve 351 provided with circumferential grooves 352 and 353 is mounted in cylinder 342. The slide valve 351 is connected to a rod 354 which is pivotally secured to brake pedal 340. Groove 352 connects ports 355 and 356 in the normal position of the slide valve. When pedal 340 is depressed, the slide valve is moved so that groove 353 connects ports 357 and 358 and closes ports 355 and 356.

Port 349 communicates with a source of vacuum or vacuum accumulator 359. In some instances, it may be desirable to employ a vacuum booster pump in this unit or in the units and systems described hereinbefore. Ports 350 and 357 are connected by means of a conduit 360. Port 358 communicates with the vacuum chamber or diaphragm chamber 336 by means of conduit 361. Ports 347 and 355 are open to the atmosphere, while ports 348 and 356 communicate with each other by means of conduit 362 and with conduit 361.

In operation, the throttle valve is regulated by the setting of the lever 332. Application of pressure to either one of the brake pedals is ineffective in affecting the setting of the throttle valve. For example, if pedal 339 is depressed, ports 347 and 348 are closed and port 350 is opened to the source of vacuum. The port 357 remains closed and port 355 remains open to the atmosphere and the vacuum chamber remains open to the atmosphere. The left hand braking means is applied and the vehicle is turned sharply to the left since the right hand drive remains unaffected. Similarly, if the brake pedal 340 is depressed, the vehicle is turned sharply to the right. In either instance, the vacuum chamber 336 remains open to the atmosphere through either port 347 or port 355.

If the brake pedal 340 is depressed simultaneously with or while the brake pedal 339 remains depressed, ports 355 and 356 are closed and ports 357 and 358 are connected. Such movement of the two slide valves open chamber 336 to the source of vacuum. Such movement of the brake pedals stops the vehicle and the action of chamber 336 permits the throttle valve to return to idling position. This type of system allows the operator full and free use of both hands since he need not alter the throttle control to reduce the fuel fed to the motor or engine to throttle level. Upon release of either or both of the brake pedals, the throttle valve is automatically opened to the original setting in a manner similar to that described in connection with Fig. 18. It is to be understood that the engine drives the wheels or caterpillar chains or tracks through a differential unit which permits a driving of either side or both side units. Since this portion of the vehicle forms no part of the present invention and since this unit is well known and conventional, I have not illustrated or described a differential drive unit.

It is to be understood that the foregoing description is but illustrative of my invention and that various modifications will suggest themselves to those skilled in the art and it is obvious that they may be made without departing from the spirit of my invention. It is also to be understood that the control and regulating units disclosed herein are not only satisfactory for use on the common types of motor or engines illustrated, but are equally satisfactory for use on any type of engine or motor in which the flow of motive power to the engine or motor is governed. For example, the control unit may be adapted for use with any motor to which the fuel is conducted to the cylinders through a valved inlet or carburetor. It is obvious that this unit is readily adapted for use on diesel type motors or engines. It is also obvious that for such vehicles as lack a clutch pedal, the brake and accelerator pedals may be separated to permit the operator to use one foot for the brake pedal and the other foot for the accelerator pedal.

Certain constructions not claimed herein are being claimed in my copending application, Serial No. 274,107, filed February 29, 1952.

I claim:

1. In a motor driven vehicle including a motor, a carburetor, a throttle valve for the carburetor and means for braking the vehicle including a brake pedal, the combination of an accelerator pedal, a vacuum chamber connected with the accelerator pedal and with the throttle valve and adapted to transmit movement of the accelerator pedal to the throttle valve and a valve operatively connected with the brake pedal which opens the vacuum chamber to the atmosphere and which connects the vacuum chamber to a source of vacuum upon movement of the brake pedal.

2. In a motor driven vehicle including a motor, a carburetor, a throttle valve for the carburetor and means for braking the vehicle including a brake pedal, the combination of an accelerator pedal, a vacuum chamber connected with the throttle valve, a diaphragm in the vacuum chamber, a sleeve secured to the diaphragm and extending from the vacuum chamber, a pull rod passing through the sleeve and connected with the accelerator pedal, and a valve operatively connected with the brake pedal which normally opens the vacuum chamber to the atmosphere and which upon movement of the brake pedal connects the vacuum chamber to a source of vacuum whereby the sleeve is fully extended.

3. In a motor driven vehicle including a motor, a carburetor, a throttle valve for the carburetor and means for braking the vehicle including a brake pedal, the combination of an accelerator pedal, a vacuum chamber connected to the accelerator pedal, a piston in the vacuum chamber, a piston rod secured to the piston and normally extending from the vacuum chamber, a second rod connected with the throttle valve and bearing against the extended end of the piston rod whereby movement of the accelerator pedal is transmitted to the throttle valve, and a valve operatively connected with the brake pedal which normally opens the vacuum chamber to the atmosphere and which upon movement of the brake pedal connects the vacuum chamber to a source of vacuum to separate the piston rod and the second named rod.

4. In an automobile or the like having a carburetor, an accelerator pedal, and a brake pedal, the combination of a first movable member connected to the accelerator pedal for movement thereby to transmit signals thereof, a second movable member connected to the carburetor to actuate the same in response to accelerator pedal signals, a lost motion or slack type connection between the members capable of transmitting signals between the members, said connection being of the type that is normally operative to transmit signals but at least a part of which is movable whereby it introduces slack or lost motion between the members and is thus inoperative and further which is movable to inoperative position without the introduction of resistance to movement of the first member and which upon movement in the opposite direction reestablishes an operative connection without adjustment of the members, said connection including an element that is operative to transfer signals between the members and has a breakable motion transmitting connection with one of the members whereby it and said one member are movable jointly along a certain path, said element being freely movable along said path relative to said one member whereby its connection is broken with said one member and it is therefore inoperative to transmit signals between the members, yieldable means holding said connection unbroken, means operatively connecting the brake pedal to the element whereby actuation of the brake urges movement of said element to an inoperative position and removes resistance of the yieldable means to breaking of said breakable connection, and means for returning said element to an operative position upon release of the brake pedal.

5. In an automobile or the like having a carburetor, an accelerator pedal, and a brake pedal, the combination of a first movable member connected to the accelerator for movement thereby to transmit signals thereof, a second movable member connected to the carburetor to actuate the same in response to accelerator pedal signals, a slack type connection between the members capable of transmitting signals between the members, said connection including a movable shoulder, one of said members including a shoulder facing said connection shoulder and connected thereto so that the shoulders may move jointly in the same directions to transmit signals between the members, means for moving the connection shoulder away from the member shoulder whereby said connection is made inoperative without introducing additional resistance to accelerator pedal movement, said shoulders facing each other when said connection is inoperative whereby upon movement of the connection shoulder toward the member shoulder the point at which the operative connection is reestablished depends upon the position of the member shoulder and does not require resetting of the accelerator pedal, means operatively connecting the brake pedal to the connection shoulder whereby actuation of the brake applies force urging said connection shoulder away from the member shoulder, and means for returning said connection shoulder to an operative position upon release of the brake pedal.

6. In an automobile or the like having a carburetor, an accelerator pedal, and a brake pedal, the combination of a longitudinally movable rod connected to the accelerator for movement thereby, a second longitudinally movable rod connected to the carburetor to actuate the same, a lost motion type connection interconnecting the rods comprising a plunger having a one-way abutment engagement with the first rod, resilient means holding the plunger in such engagement, means connecting the second rod to the plunger whereby movement of the plunger moves said rod, fluid pressure operative means operative in opposition to said resilient means, means operatively connecting the brake pedal to the fluid pressure means whereby actuation of the brake actuates said means to overcome the resilient means and allow movement of the plunger to break the abutment engagement.

7. The invention set forth in claim 5 wherein said connection includes a pressure chamber housing supported on said members and movable with them, said one member being movable relative to said housing and providing said member shoulder, the other of said members being fixed to said housing, a pressure responsive movable element in said housing providing said connection shoulder, said means operatively connecting the brake pedal to the connection shoulder comprising pressure fluid communication means controlled by said brake pedal for supplying pressure to one side of said pressure responsive member in said housing.

RAY C. STRAUSS.

References Cited in the file of this patent

UNITED STATES PATENTS

| Number | Name | Date |
|---|---|---|
| 1,979,488 | Perez | Nov. 6, 1934 |
| 2,036,619 | Brown | Apr. 7, 1936 |
| 2,067,848 | Hnezdo et al. | Jan. 12, 1937 |
| 2,116,556 | Bellis | May 10, 1938 |
| 2,117,016 | Brumbaugh | May 10, 1938 |
| 2,139,569 | Alvarado | Dec. 6, 1938 |
| 2,183,354 | Lange | Dec. 12, 1939 |
| 2,200,685 | Anderson | May 14, 1940 |
| 2,203,777 | Detmers | June 11, 1940 |
| 2,252,009 | Kenny | Aug. 12, 1941 |
| 2,267,996 | Spase | Dec. 30, 1941 |
| 2,311,120 | Mossinghoff | Feb. 16, 1943 |

FOREIGN PATENTS

| Number | Country | Date |
|---|---|---|
| 285,287 | Great Britain | Feb. 16, 1928 |